US011866165B2

United States Patent
Deatrick et al.

(12) 
(10) Patent No.: US 11,866,165 B2
(45) Date of Patent: Jan. 9, 2024

(54) DUCT STRINGERS HAVING OVALOID VENTS FOR AIRCRAFT WING BOXES

(71) Applicant: The Boeing Company, Chicago, IL (US)

(72) Inventors: Christopher John Deatrick, Everett, WA (US); Bonnie Ann Keefe, Everett, WA (US); Erik Alan Phillips, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/671,309

(22) Filed: Feb. 14, 2022

(65) Prior Publication Data

US 2023/0312077 A1  Oct. 5, 2023

(51) Int. Cl.
*B64C 3/18* (2006.01)
*B64D 37/08* (2006.01)
*B64C 3/34* (2006.01)
*B64C 1/06* (2006.01)

(52) U.S. Cl.
CPC .............. *B64C 3/182* (2013.01); *B64C 1/064* (2013.01); *B64C 3/34* (2013.01); *B64D 37/08* (2013.01)

(58) Field of Classification Search
CPC  B64C 1/064; B64C 3/18; B64C 3/182; B64C 3/34; B64D 37/34
See application file for complete search history.

(56) References Cited

U.S. PATENT DOCUMENTS

| 11,597,495 | B2* | 3/2023 | Patterson | B64C 3/182 |
| 2012/0248244 | A1* | 10/2012 | Brownjohn | B64C 1/064 244/118.5 |
| 2013/0316147 | A1* | 11/2013 | Douglas | B29D 99/0003 156/60 |
| 2020/0001970 | A1* | 1/2020 | Douglas | B64C 3/182 |
| 2020/0002022 | A1* | 1/2020 | Douglas | F16L 37/248 |
| 2020/0010176 | A1* | 1/2020 | Douglas | B64C 3/38 |
| 2021/0291998 | A1* | 9/2021 | Levine | B64D 37/10 |
| 2023/0031639 | A1* | 2/2023 | Patterson | B64C 3/182 |

OTHER PUBLICATIONS

Hurlimann, F. Aerospace Science and Technology, Jun. 2011 (Year: 2011).*

* cited by examiner

*Primary Examiner* — Nicholas McFall
(74) *Attorney, Agent, or Firm* — Kolitch Romano Dascenzo Gates LLC

(57) ABSTRACT

Duct stringers for aircraft wing boxes. The duct stringer comprises a base, a pair of sidewalls projecting from the base in a spaced-apart relationship, and a cap wall that extends between and interconnects the pair of sidewalls, with the cap wall being positioned spaced apart from the base by the pair of sidewalls. The duct stringer further comprises an ovaloid vent formed in the cap wall. The ovaloid vent comprises a perimeter that circumscribes an aperture and that defines a closed shape. The perimeter comprises a pair of curved end regions opposed to one another and that each arc at least substantially through 180 degrees. Each curved end region comprises a non-uniform radius of curvature.

20 Claims, 8 Drawing Sheets

DUCT STRINGERS HAVING OVALOID VENTS FOR AIRCRAFT WING BOXES

FIELD

The present disclosure relates to duct stringers having ovaloid vents for aircraft wing boxes.

BACKGROUND

The term wing box typically refers to the primary load carrying structure of an aircraft wing. Most aircraft wing boxes include an upper skin and a lower skin that are spaced apart from one another to define an interior space of the aircraft wing box therebetween. Some aircraft wing boxes are constructed with at least one fuel tank that includes, or encompasses, a portion of the interior space. Most aircraft wing boxes also include a plurality of stringers that extend generally aligned with the span of the wing and that each provide structural support the upper or lower skin. Specifically, each stringer may be attached to an interior face of the respective skin that faces the interior space of the aircraft wing box.

In recent years, certain stringers are constructed to enclose an interior volume that may be used as a conduit within the aircraft wing box. As a more specific example, such stringers may be utilized to channel fluid to or from an aircraft fuel tank during deployment of the aircraft. Typically, this type of stringer is provided with one or more openings or vents that extend through a wall of the stringer to provide access to its interior volume. These openings or vents form an irregularity that often creates areas of stress concentration in the stringer surrounding the vent or opening. For this reason, aircraft wing boxes that utilize this type of stringer typically also include structural reinforcements, or pad-ups, positioned about each opening or vent. Previous designs have utilized racetrack-shaped vents or openings, which include circular curved end regions, and these geometries are not optimized with respect to stress concentration. As a result, excessively bulky pad-ups are required to reinforce a wing box about each of these racetrack-shaped vents, and these pad-ups add excess weight to the wing box.

SUMMARY

Duct stringers, aircraft wing boxes that comprise at least one duct stringer, and methods of operating an aircraft are disclosed herein. The duct stringer comprises a base, a pair of sidewalls projecting from the base in a spaced-apart relationship, and a cap wall that extends between and interconnects the pair of sidewalls, with the cap wall being positioned spaced apart from the base by the pair of sidewalls. The duct stringer further comprises an ovaloid vent formed in the cap wall. The ovaloid vent comprises a perimeter that circumscribes an aperture and that defines a closed shape. The aperture may provide access to an interior volume of the vent stringer that is defined between the cap wall and the pair of sidewalls. The perimeter comprises a pair of curved end regions that are opposed to one another and that each arc at least substantially through 180 degrees. Each curved end region comprises a non-uniform radius of curvature. In some examples, each curved end region comprises a non-elliptical shape. In some examples, the ovaloid vent is configured to permit fluid communication to the interior volume and a region exterior to the duct stringer.

The aircraft wing box comprises an upper skin, a lower skin, a leading spar, a trailing spar spaced aft of the leading spar, a plurality of ribs extending between and interconnecting the leading spar and the trailing spar, and a plurality of stringers extending transverse to the ribs. The plurality of stringers are operatively coupled to and support the upper skin and at least one stringer of the plurality of stringers is the duct stringer. In some examples, the aircraft wing box comprises an interior space and an aircraft fuel tank encompassing a portion of the interior space, and the ovaloid vent of the duct stringer is positioned within the aircraft fuel tank.

The methods comprise storing aircraft fuel within the aircraft fuel tank of the aircraft wing box, delivering aircraft fuel to or from the aircraft fuel tank, and channeling fluid to or from the aircraft fuel tank via the ovaloid vent.

DESCRIPTION

Figure 1:
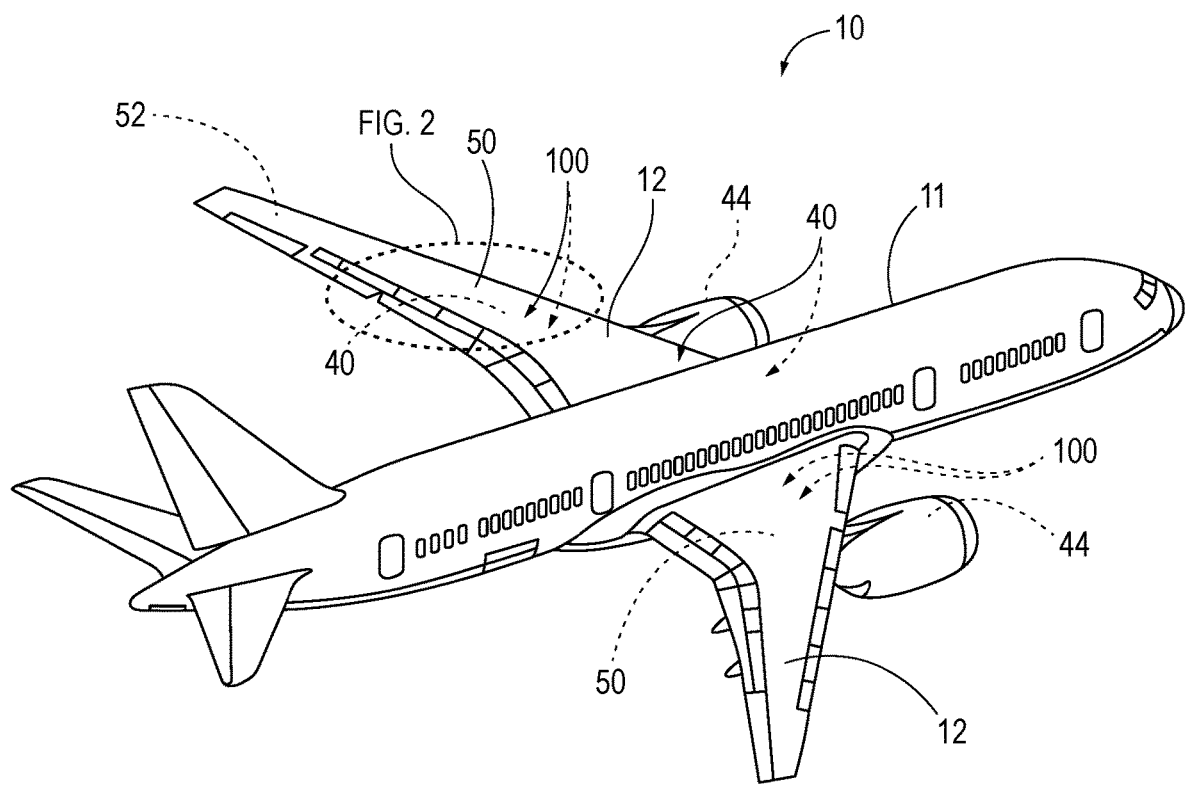
FIG. 1 is an illustration of examples of aircraft including at least one duct stringer according to the present disclosure.

FIGS. 1-8 provide examples of duct stringers 100, aircraft wing boxes 50 comprising at least one duct stringer 100, aircraft 10 comprising at least one duct stringer 100, and methods of operating an aircraft that comprises at least one duct stringer 100 according to the present disclosure. Elements that serve a similar, or at least substantially similar, purpose are labelled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure.

Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure. Also in the figures, dot-dash lines are utilized to indicate various virtual features, such as axes, dimensions, etc. that may be defined by the illustrated embodiment.

FIG. 1 is an illustration of an example aircraft 10 that comprises at least one duct stringer 100, according to the present disclosure. Examples of duct stringers 100 are illustrated in FIGS. 2-7 and discussed in more detail herein with reference thereto. As shown in the example of FIG. 1, aircraft 10 typically comprises at least a fuselage 11 and wings 12 that are attached to the fuselage 11. Each wing comprises an aircraft wing box 50, and each aircraft wing box 50 may define and/or comprise at least one aircraft fuel tank 40. At least one aircraft wing box 50, and optionally each aircraft wing box 50, comprises at least one duct stringer 100. Duct stringer 100 may be configured to channel fluid to within and/or from within the at least one aircraft fuel tank 40 of the respective aircraft wing box 50. Aircraft wing boxes 50 additionally or alternatively may be referred to herein as wing boxes 50. Examples of aircraft wing boxes 50 according to the present disclosure are illustrated and discussed in more detail herein with reference to FIGS. 2-3. Aircraft 10 also may comprise at least one engine 44, and each engine 44 may be operatively attached to a respective wing 12. Aircraft fuel may be supplied from aircraft fuel tank(s) 40 to a corresponding engine 44 during flight and/or taxiing operations. In some examples, aircraft 10 comprises a plurality of aircraft fuel tanks 40 in each aircraft wing box 50, and duct stringer 100 may be configured to provide fluid communication between at least some of the plurality of aircraft fuel tanks 40. Additionally or alternatively, aircraft 10 may comprise a surge tank 52 within aircraft wing box 50 that is configured to receive fluid from aircraft fuel tank(s) 40. In some examples, surge tank 52 is positioned outboard of aircraft fuel tank(s) 40. In some examples, duct stringer 100 is configured to provide fluid communication between aircraft fuel tank(s) 40 and surge tank 52 and/or to channel fluid between aircraft fuel tank(s) 40 and surge tank 52. In some examples, duct stringer 100 is configured to provide fluid communication between aircraft fuel tank 40 and the atmosphere surrounding aircraft 10. As referred to herein, a fluid may include a liquid (e.g., aircraft fuel), a vapor (e.g., vaporized aircraft fuel), a gas (e.g., air or an inert gas), and/or combinations thereof. For reasons discussed in more detail herein, an aircraft wing box 50 that includes at least one duct stringer 100 according to the present disclosure, which comprise ovaloid vent(s), may be lighter than, or less massive than, an otherwise equivalent aircraft wing box that includes conventional duct stringers with racetrack-shaped vent(s) in place of duct stringers 100 according to the present disclosure. Accordingly, aircraft 10 according to the present disclosure may be lighter, or less massive than, otherwise equivalent aircraft that include wing boxes having duct stringers with conventional racetrack-shaped vents.

Aircraft 10 may comprise any suitable type of aircraft, with examples comprising private aircraft, commercial aircraft, cargo aircraft, passenger aircraft, military aircraft, jetliners, wide-body aircraft, and/or narrow-body aircraft. Aircraft 10 is configured to, or may be used to, transport any suitable type of payload such as passengers, crew, cargo, and/or combinations thereof. While FIG. 1 shows an example in which aircraft 10 is a fixed wing aircraft, duct stringers 100 may be comprised in and/or utilized with any other suitable type of aircraft, such as rotor craft and/or helicopters, without departing from the scope of the present disclosure.

Figure 2:
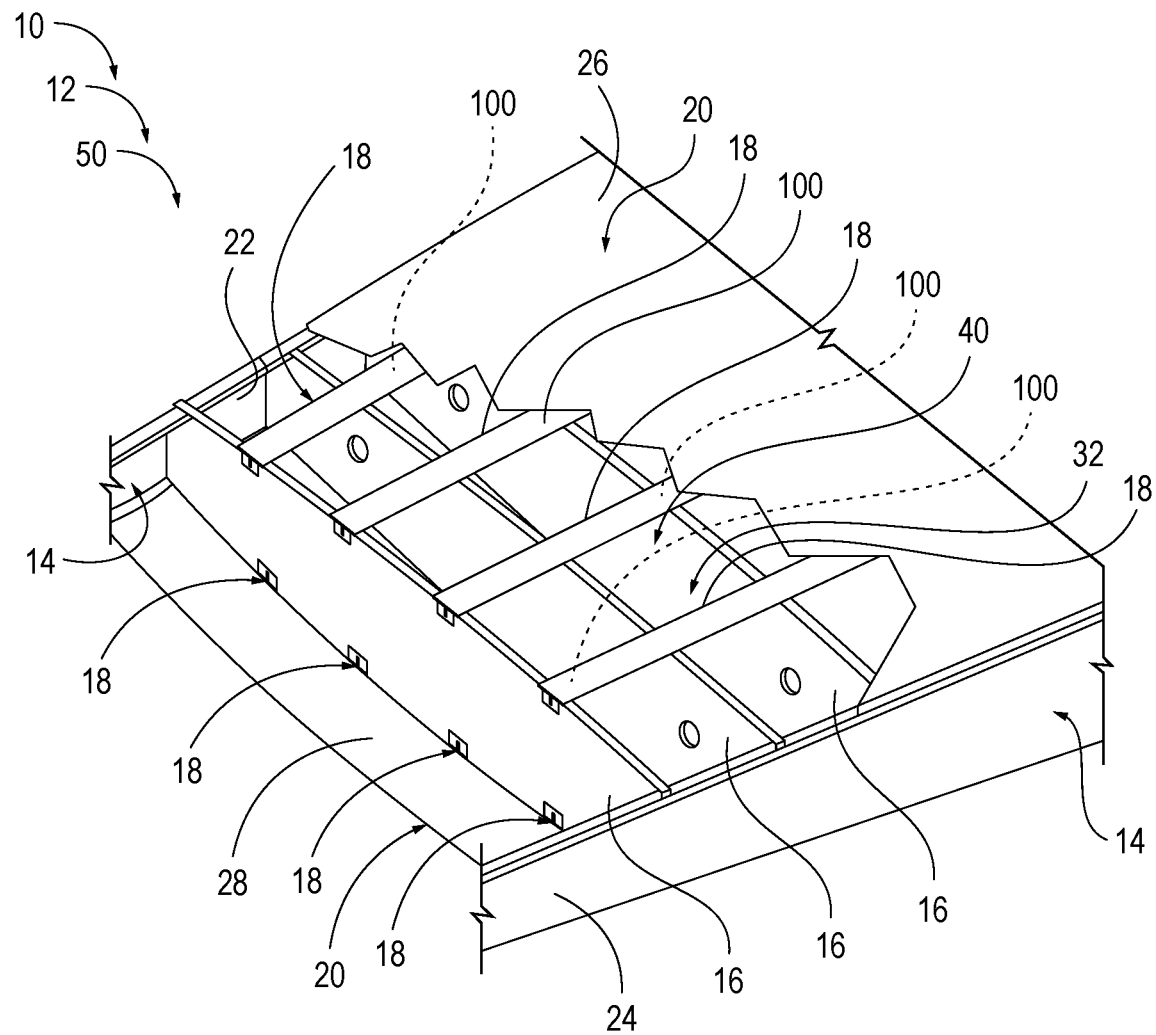
FIG. 2 is schematic cut away view illustrating examples of aircraft wing boxes that include at least one duct stringer according to the present disclosure.

FIG. 2 schematically represents examples of aircraft wing boxes 50 according to the present disclosure. As shown in FIG. 2, aircraft wing box 50 comprises spars 14, which typically comprise a leading spar 22 and a trailing spar 24 that is spaced aft of the leading spar 22. Aircraft wing box 50 also comprises a plurality of ribs 16 that are spaced apart from one another and extend between spars 22, 24, and stringers 18 that are spaced apart from one another and extend transverse to ribs 16. Aircraft wing box 50 further comprises skins 20, namely, an upper skin 26 and a lower skin 28. Upper skin 26 and lower skin 28 are joined with ribs 16, stringers 18, and spars 14 such that ribs 16, stringers 18, and spars 14 support at least central portions of upper skin 26 and lower skin 28 spaced apart from one another. Specifically, aircraft wing box 50 comprises a plurality of stringers 18 operatively coupled to and supporting upper skin 26, and a plurality of stringers 18 operatively coupled to and supporting lower skin 28.

Aircraft wing box 50 may define an interior space 32. Specifically, upper skin 26 and lower skin 28 may form the upper and lower boundaries of interior space 32, and spars 22, 24 may form the forward and aft boundaries of interior space 32. Aircraft wing box 50 also may comprise at least one aircraft fuel tank 40 that is configured to store aircraft fuel within a portion of interior space 32. Specifically, each aircraft fuel tank 40 may be defined between a pair of ribs 16 that fluidly separate aircraft fuel tank 40 from the remainder of interior space 32. These ribs 16 additionally or alternatively are referred to as tank end ribs. Aircraft wing box 50 may comprise a plurality of aircraft fuel tanks 40 that are fluidly separated from one another and/or from the remainder of interior space 32 by tank end ribs 16. Aircraft wing box 50 also may comprise surge tank 52 that encloses a portion of interior space 32 and is fluidly separated from aircraft fuel tank(s) 40 by at least one rib 16.

At least one stringer 18, and optionally a plurality of stringers 18, of aircraft wing box 50 is, or are, a duct stringer 100. In some examples, at least one stringer 18 that supports upper skin 26 is a duct stringer 100. Additionally or alternatively, in some examples, at least one stringer that supports lower skin 28 is a duct stringer 100. As discussed in more detail herein, in some examples, duct stringers 100 are coupled to the corresponding skin 20 to define an internal volume that may be utilized to channel fluid through duct stringer 100. Each duct stringer 100 comprises at least one ovaloid vent that permits fluid communication between interior space 32 of aircraft wing box 50 and the interior volume of duct stringer 100. Aircraft wing box 50 also may include stringers 18 that are ducted and/or that define an interior volume similar to duct stringers 100 but that do not include at least one ovaloid vent as do duct stringers 100 according to the present disclosure. In some examples, the at least one ovaloid vent of duct stringer 100 is positioned within an aircraft fuel tank 40 such that duct stringer 100 is configured to channel fluid to or from aircraft fuel tank 40. In some examples, duct stringer 100 comprises two or more ovaloid vents respectively positioned in fluidly isolated regions of interior space 32 (e.g., separate aircraft fuel tanks 40 and/or surge tank 52 and aircraft fuel tank 40) such that duct stringer 100 may provide fluid communication and/or channel fluid therebetween. As more specific examples, duct stringer 100 may be utilized to provide inerting gas to aircraft fuel tank 40, channel aircraft fuel overflow from aircraft fuel tank 40, and/or vent gas or aircraft fuel vapors from aircraft fuel tank 40.

In some examples, one or more components of aircraft wing box 50 are formed of a composite material. In some examples, aircraft wing box 50 is, or may be referred to as, a composite aircraft wing box. As more specific examples, one or more of, and optionally each of, spars 14, ribs 16, skins 20, and stringers 18 are formed of a composite material, and more specifically, a fiber-reinforced composite material. In some examples, ribs 16 or other components of aircraft wing box 50 may be formed of a metal or a metal alloy. Duct stringer 100 also may be formed of a fiber-reinforced composite material and/or be referred to as a composite duct stringer 100. Fiber-reinforced composite materials additionally or alternatively may be described as or referred to as fiber-reinforced polymers, or plastics. As used herein, a fiber-reinforced composite material should be understood to include at least an epoxy or other polymer or binding material together with fibers, such as (but not limited to) carbon fibers, boron fibers, para-aramid (e.g., Kevlar®) fibers, and/or other fibers. In some examples, the fibers are unidirectional. Additionally or alternatively, in some examples, the fibers are woven into a fabric. In some examples, spars 14, ribs 16, skins 20, and stringers 18 each are constructed of multiple layers, or plies, of fiber-reinforced composite material. In such examples, the fibers of a given layer, or ply, may be oriented in the same direction or in different directions. The number of layers or plies of fiber-reinforced composite material selected to form a given component, or region thereof, may be chosen based on the type or magnitude of load that is applied to the component or region thereof under operative conditions. As referred to herein, a given component may be referred to as a composite component, or a fiber-reinforced composite component (e.g., a composite duct stringer 100) when the component is at least substantially formed of a fiber-reinforced composite material.

Figure 3:
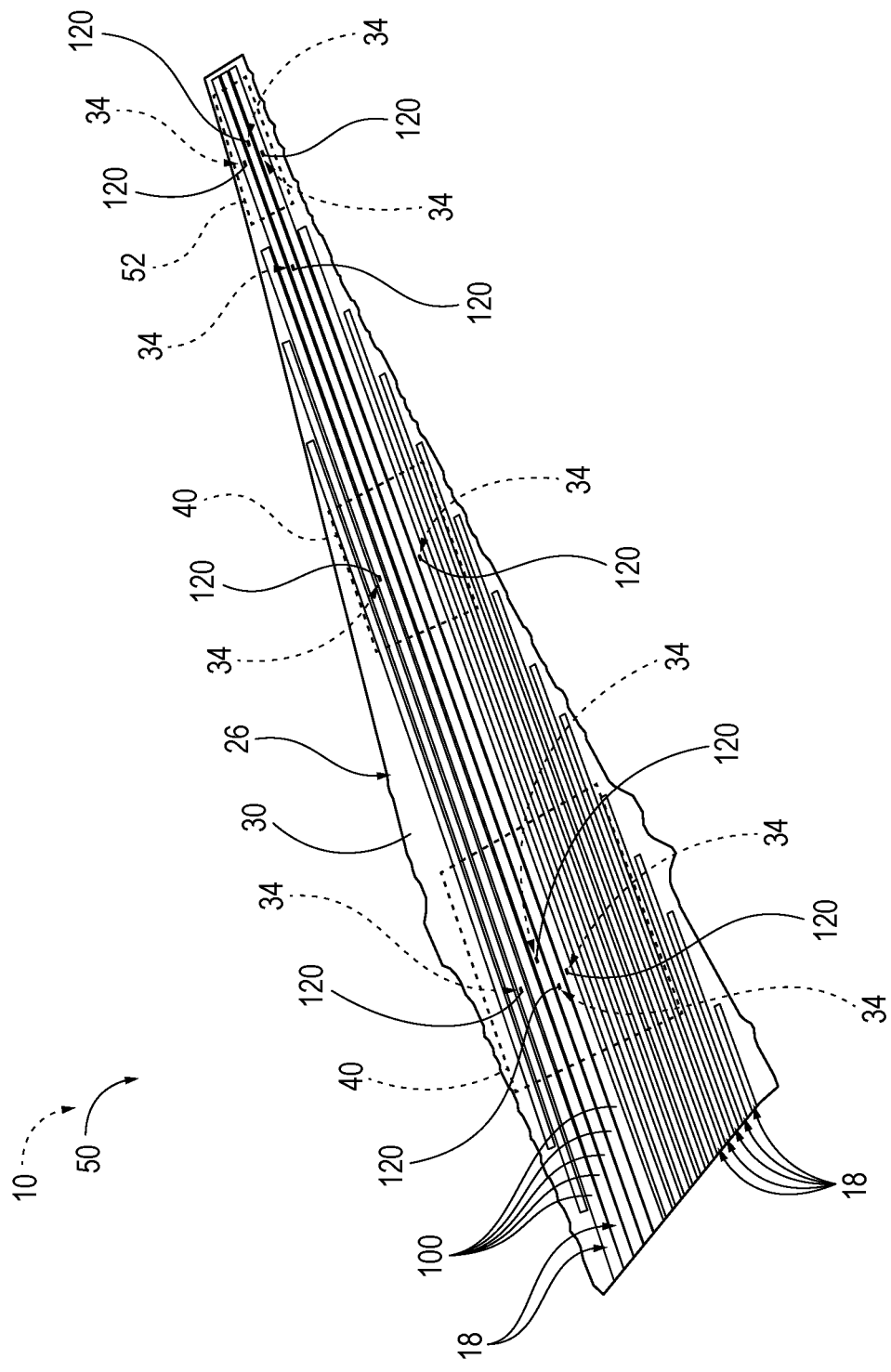
FIG. 3 is a schematic cutaway view illustrating examples of an upper panel of an aircraft wing box that includes a plurality of duct stringers according to the present disclosure.

FIG. 3 is a schematic cutaway view illustrating examples of an upper panel of aircraft wing box 50 that comprises a plurality of duct stringers 100. Specifically, the upper panel of aircraft wing box 50 includes upper skin 26 and stringers 18 that support upper skin 26 and that extend along skin interior surface 30 thereof. A plurality of, but optionally fewer than all of, stringers 18 supporting upper skin 26 are duct stringers 100. In these examples, each duct stringer 100 comprises at least two ovaloid vents 120 spaced apart from one another along a length of duct stringer 100. However, in other examples, duct stringer 100 comprises a single ovaloid vent 120. In some examples, a first ovaloid vent 120 of duct stringer 100 is positioned within an aircraft fuel tank 40 and a second ovaloid vent 120 of duct stringer 100 is positioned within surge tank 52. Additionally or alternatively, in some examples the second ovaloid vent 120 is positioned within a second aircraft fuel tank 40. In some such examples, duct stringer 100 further comprises a third ovaloid vent 120 positioned within surge tank 52.

In some examples, aircraft wing box 50 comprises a vent pad-up 34 integrated into aircraft wing box 50 about, or surrounding each, ovaloid vent 120 to reinforce aircraft wing box 50 about ovaloid vent 120. For example, when upper skin 26 and duct stringer 100 are formed of a composite material, vent pad-up 34 may include additional layers, or plies, of composite material added to upper skin 26 and/or duct stringer 100 about ovaloid vent 120 to reinforce aircraft wing box 50 about ovaloid vent 120. As discussed in more detail herein, ovaloid vent 120 may produce reduced strain concentration in upper skin 26 and/or duct stringer 100 relative to functionally similar vents that comprise a different construction, for example, conventional, racetrack-shaped vents, which include circular curved end regions. As such, aircraft wing boxes 50 according to the present disclosure, which comprise duct stringers 100, may comprise vent pad-ups 34 with less reinforcing material and/or less total mass as compared to aircraft wing boxes with vents having a construction different from ovaloid vents 120, and more specifically, vents having the conventional racetrack shape. In other words, ovaloid vents 120 according to the present disclosure may comprise a uniquely strong geometry that requires less reinforcement relative to other designs.

Figure 4:
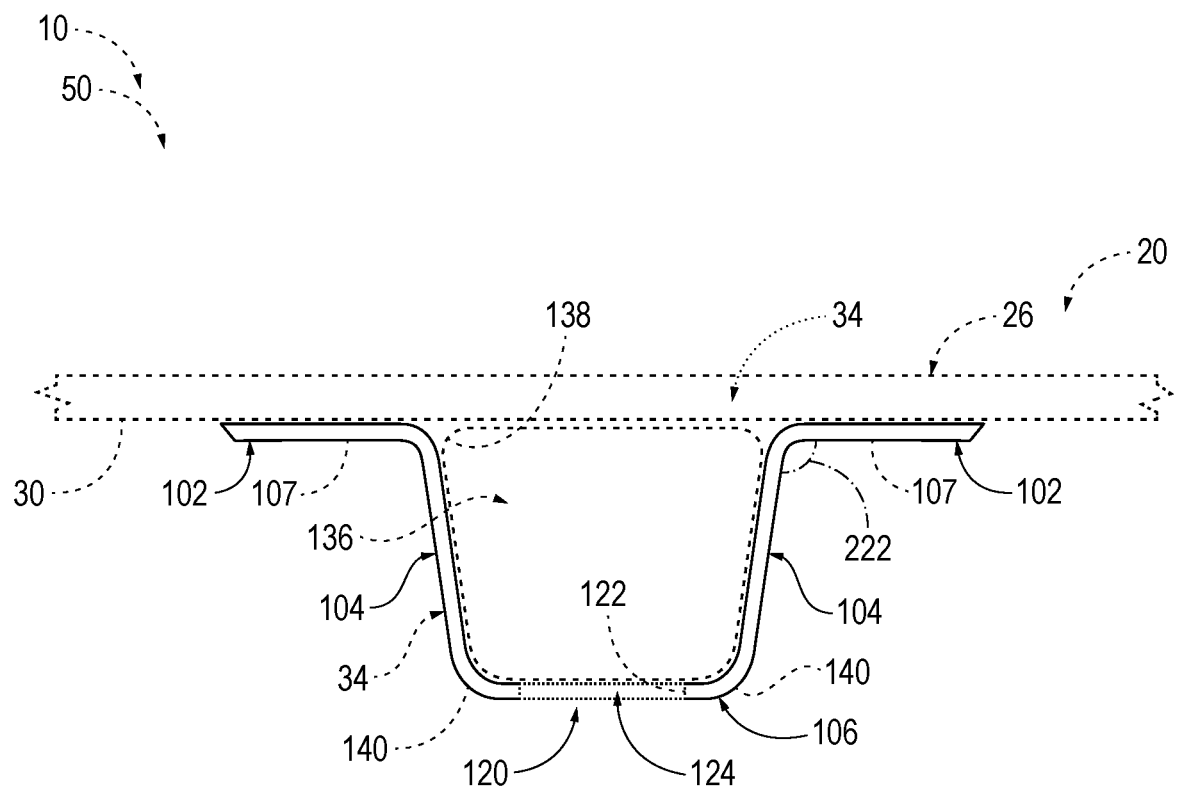
FIG. 4 is a schematic cross-sectional view illustrating examples of duct stringers according to the present disclosure.
Figure 5:
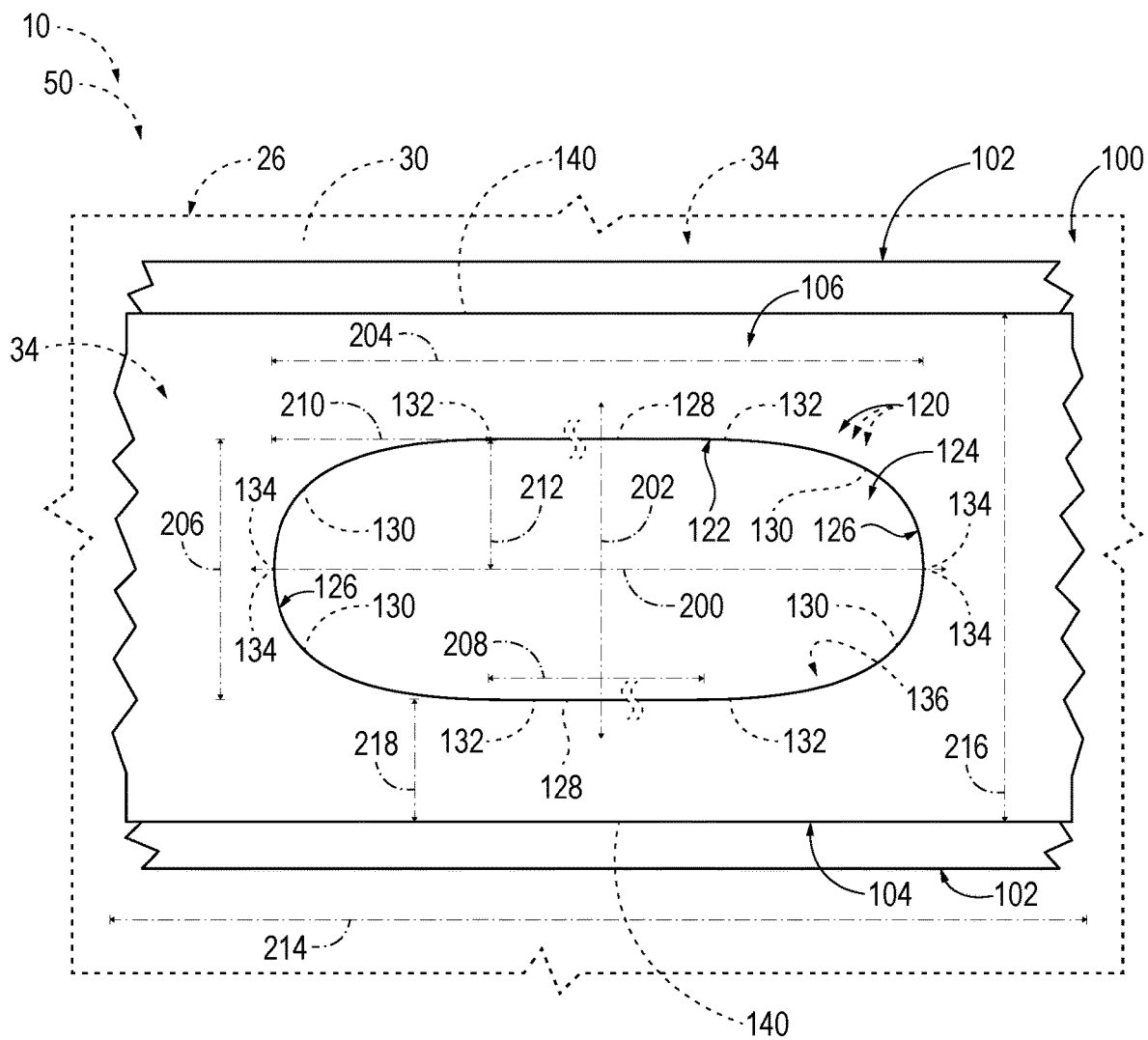
FIG. 5 is a schematic plan view illustrating examples of duct stringers according to the present disclosure.

FIGS. 4-5 schematically represent examples of duct stringers 100, according to the present disclosure. More specifically, FIG. 4 is a schematic cross-sectional view taken in a plane normal to a length 214 of duct stringer 100, and FIG. 5 is a schematic plan view showing a section of duct stringers 100. With reference to FIGS. 4-5, duct stringers 100 comprise a base 102 and a pair of sidewalls 104 projecting from the base 102 in a spaced-apart relationship. Base 102 is configured to be attached to and support a skin interior surface 30 of skin 20. In some examples, base 102 extends parallel to skin interior surface 30 and/or is sealingly attached to skin interior surface 30. In some examples, base 102 is separated into two portions with a corresponding sidewall 104 extending from either portion of base 102. In some examples, sidewalls 104 project symmetrically from base 102. Each sidewall 104 projects from base 102 at a sidewall angle 222 that is measured between the sides of base 102 and sidewall 104 that face away from an interior volume 136 of duct stringer 100. Examples of suitable sidewall angles 222 for either sidewall 104 include at least 65°, at least 70°, at least 75°, at least 80°, at least 90°, at least 95°, at least 100°, at most 80°, at most 90°, at most 95°, at most 100°, at most 105°, and/or at most 110°, where sidewall angles 222 greater than 90° correspond to sidewall 104 projecting towards the other sidewall 104.

Duct stringer 100 further comprises a cap wall 106 that extends between and interconnects sidewalls 104. Cap wall 106 is spaced apart from base 102 by sidewalls 104. In other words, sidewalls 104 support cap wall 106 spaced apart from base 102. In this way, cap wall 106 and sidewalls 104 define three sides to an interior volume 136 encompassed or defined by duct stringer 100. A fourth side to interior volume 136 may be formed by skin 20 when base 102 is affixed to skin 20 and/or by base 102. In some examples, duct stringer 100 further comprises a lining 138 that extends along surfaces of sidewalls 104 and cap wall 106 that face interior volume 136, and lining 138 optionally may form the fourth side to interior volume 136. In some examples, base 102 comprises a pair of flanges 107 that project away from, and optionally parallel to, cap wall 106 to extend flush with skin interior surface 30.

Duct stringer 100 further comprises at least one ovaloid vent 120 formed in cap wall 106. Ovaloid vent 120 comprises a perimeter 122 that circumscribes an aperture 124 and that defines a closed shape. Accordingly, ovaloid vent 120 may be defined as including a portion of cap wall 106 that is immediately adjacent to and that surrounds aperture 124. In some examples, aperture 124 provides fluid communication between interior volume 136 and a region exterior to duct stringer 100, for example, interior space 32 of aircraft wing box 50. In some examples, duct stringer 100 is configured to channel fluid flow within interior volume 136, and ovaloid vent 120 is configured to permit fluid flow into and/or from interior volume 136 via aperture 124. As mentioned, in some examples, duct stringer 100 comprises a plurality of ovaloid vents 120 that are spaced apart from one another along length 214 of duct stringer 100. In some such examples, the plurality of ovaloid vents 120 are configured to provide fluid communication between fluidly isolated regions of interior space 32 of aircraft wing box 50, as discussed herein.

Perimeter 122 comprises a pair of curved end regions 126 opposed to one another and that each arc at least substantially through 180 degrees. Ovaloid vent 120 defines a longitudinal axis 200 and a lateral axis 202, where longitudinal axis 200 bisects each curved end region 126, and lateral axis 202 interposes curved end regions 126, such that curved end regions 126 extend from either side of lateral axis 202. Each curved end region 126 comprises a non-uniform radius of curvature. This is different from a conventional, racetrack-shaped vent, which includes circular curved end regions. A non-uniform radius of curvature additionally or alternatively may be referred to as a variable radius of curvature. In other words, each curved end region 126 follows a non-circular path of curvature. In some examples, each curved end region 126 comprises a non-elliptical curved shape, meaning that equation 1, which is provided below and defines the elliptical family of curves, cannot be mapped onto either curved end region 126.

$$\frac{x^2}{a^2} + \frac{y^2}{b^2} = 1 \quad (1)$$

Where x is taken along an axis aligned with a longitudinal axis 200, y is taken along an axis parallel to a lateral axis 202, a is the semi-major axis of the ellipse, and b is the semi-minor axis of the ellipse.

In some examples, the closed shape defined by perimeter 122 is a convex closed shape, in that perimeter 122 does not include any concave curved regions. In some examples, curved end regions 126 are symmetrical about lateral axis 202 and/or form mirror images of one another about lateral axis 202. In some examples, each curved end region 126 is symmetrical about longitudinal axis 200. Ovaloid vent 120 also may be elongated along longitudinal axis 200. In particular, perimeter 122 may further comprise a pair of linear sections 128 that extend parallel to longitudinal axis 200, spaced apart from one another along lateral axis 202, and between curved end regions 126. In some examples, lateral axis 202 bisects each linear section 128. Stated another way, curved end regions 126 may be spaced apart from each other by linear sections 128.

Ovaloid vent 120 may be oriented on and/or sized relative to cap wall 106 in any suitable manner. In some examples, longitudinal axis 200 of ovaloid vent 120 is substantially aligned with the length 214 of duct stringer 100. In this context, "substantially aligned with length 214" is defined as longitudinal axis 200 being within 5 degrees of parallel to length 214. In some such examples, ovaloid vent 120 is elongated along length 214 of duct stringer 100. In some examples, cap wall 106 comprises a pair of cap wall edges 140 along which cap wall 106 intersects sidewalls 104, and cap wall 106 defines a cap wall width 216 that is measured between cap wall edges 140. In some examples, ovaloid vent 120 is positioned on cap wall 106 with an edge clearance 218 between perimeter 122 and either cap wall edge 140. In some examples, ovaloid vent 120 is positioned centrally on cap wall 106 with respect to cap wall width 216 such that edge clearance 218 is at least substantially the same on either side of ovaloid vent 120. In other words, ovaloid vent 120 may be centered on cap wall 106 such that longitudinal axis 200 bisects cap wall width 216. In some examples, ovaloid vent 120 is dimensioned and/or oriented relative to cap wall 106 such that edge clearance 218 is a threshold fraction of cap wall width 216. Suitable examples of the threshold fraction of edge clearance 218 to cap wall width 216 include at least 5%, at least 10%, at least 12%, at least 15%, at least 20%, at least 25%, at most 12%, at most 15%, at most 20%, at most 25%, at most 30%, and/or at most 35%.

In some examples, each curved end region 126 comprises a first curved segment 130 and a second curved segment 130 that meet one another at longitudinal axis 200 and that together form the entirety of the corresponding curved end region 126. In other words, curved segments 130 of a given curved end region 126 may be continuous with one another and/or define a smooth curve together. Each curved segment 130 comprises a proximal end 132 that extends nearest to lateral axis 202 and a distal end that meets longitudinal axis 200. In some examples, each curved segment 130 approaches a parallel relationship to or is parallel to longitudinal axis 200 at its proximal end 132 and/or approaches a parallel relationship to or is parallel to lateral axis 202 at its distal end 134. For examples in which perimeter 122 comprises linear sections 128, proximal end 132 of each curved segment 130 intersects a corresponding linear section 128. In some examples, each curved segment 130 comprises a decreasing radius of curvature in a direction from proximal end 132 to distal end 134. Stated in slightly different terms, each curved segment may comprise a greater degree of curvature, or curve away from being parallel to longitudinal axis 200 at an increasing rate, in a direction from proximal end 132 to distal end 134.

As perhaps best seen in FIG. 5, each curved segment 130 may define a curved segment length 210 that is measured along longitudinal axis 200 between proximal end 132 and distal end 134 thereof, and a curved segment span 212 that is measured along lateral axis 202 between proximal end 132 and distal end 134 thereof. In some examples, each curved segment 130 encompasses a respective area of aperture 124 that is greater than an area encompassed by an elliptical curved segment having an equivalent curved segment length 210 and an equivalent curved segment span 212. As defined herein, an elliptical curved segment refers to a curved segment that follows any of the curves defined by Equation 1. Stated in broader terms, perimeter 122 defines a perimeter length 204 and a perimeter width 206, and perimeter 122 may encompass a larger area than an otherwise equivalent perimeter that has the same perimeter length 204 and perimeter width 206, but that has elliptical curved end regions 126.

In some examples, each curved segment 130 substantially has the formula of Equation 2:

$$y(x) = \frac{b(2\sqrt{a}\sqrt{a-x} - (a-x))}{b} \quad (2)$$

Where b is the curved segment span 212, a is the curved segment length 210, x is taken along an axis aligned with the longitudinal axis 200 and originating at proximal end 132, and y is taken along an axis that is parallel to lateral axis 202 and intersects proximal end 132. In this context, each curved segment 130 "substantially" having the formula of Equation 2 is defined as each curved segment 130 extending within 5% of curved segment length 210 from the curve of Equation 2 at any point along curved segment 130.

In some examples, ovaloid vent 120 is dimensioned such that the curved segment span 212 of each or any curved segment 130 is a threshold fraction of cap wall width 216, with suitable examples of the threshold fraction of curved segment span 212 to cap wall width 216 including at least 0.2, at least 0.25, at least 0.3, at least 0.32, at least 0.33, at last 0.35, at least 0.36, at least 0.38, at least 0.4, at most 0.3, at most 0.32, at most 0.33, at most 0.35, at most 0.36, at most 0.38, at most 0.4, at most 0.42, at most 0.45, and/or at most 0.49. More specific examples of curved segment span 212 include at least 1.75 cm, at least 2 cm, at least 2.2 cm, at least 2.3 cm, at least 2.4 cm, at least 2.5 cm, at least 2.6 cm, at most 2.2 cm, at most 2.3 cm, at most 2.4 cm, at most 2.5 cm, at most 2.6 cm, at most 2.7 cm, and/or at most 3 cm.

In some examples, any or each curved segment 130 is dimensioned such that curved segment length 210 is a threshold fraction of curved segment span 212. As examples, the threshold fraction of curved segment length 210 to curved segment span 212 may be at least 1, at least 1.2, at least 1.4, at least 1.5, at least 1.6, at least 1.7, at least 1.8, at least 1.9, at least 2, at least 2.2, at least 2.4, at most 1.2, at most 1.4, at most 1.5, at most 1.6, at most 1.7, at most 1.8, at most 1.9, at most 2, at most 2.2, at most 2.4, at most 2.6, and/or at most 3. More specific examples of curved segment length 210 comprise at least 3 cm, at least 3.5 cm, at least 3.75 cm, at least 3.8 cm, at least 4 cm, at least 4.25 cm, at least 4.5 cm, at least 4.75 cm, at least 5 cm, at most 3.8 cm, at most 4 cm, at most 4.25 cm, at most 4.5 cm, at most 4.75 cm, at most 5 cm, at most 5.25 cm, at most 5.5 cm, and/or at most 6 cm.

As shown in FIG. 5, when included in ovaloid vent 120, each linear section 128 defines a linear section length 208. In some examples, curved segment 130 and linear section 128 are dimensioned relative to one another such that curved segment length 210 is a threshold fraction of linear section length 208. As examples, the threshold fraction of curved segment length 210 to linear section length 208 may be at least 0.2, at least 0.3, at least 0.35, at least 0.4, at least 0.45, at least 0.5, at least 0.6, at least 0.65, at least 0.7, at least 0.75, at least 0.8, at least 0.9, at least 1.0, at least 1.1, at least 1.2, at least 1.3, at most 0.3, at most 0.35, at most 0.4, at most 0.45, at most 0.5, at most 0.6, at most 0.65, at most 0.7, at most 0.74, at most 0.8, at most 0.9, at most 1.0, at most 1.1, at most 1.2, at most 1.3, at most 1.4, and/or at most 1.5. Perimeter 122 defines a perimeter width 206 that is measured parallel to lateral axis 202 and a perimeter length 204 that is measured parallel to longitudinal axis 200. In some examples, perimeter length 204 is equal to the sum of linear section length 208 and curved segment length 210 of both curved end regions 126. In some examples, perimeter width 206 is equal to twice the curved segment span 212 of any curved segment 130.

Ovaloid vent 120 may comprise a hydraulic diameter (Dh) that is defined according to Equation 3:

$$D_h = \frac{4A}{P} \quad (3)$$

Where A is the area of aperture 124 and P is the wetted perimeter (i.e., total wetted arch length) of perimeter 122. In some examples, the hydraulic diameter of ovaloid vent 120 is greater than an elliptical vent having equivalent nominal dimensions. As referred to herein, an "elliptical vent having equivalent nominal dimensions" refers to a vent having a perimeter with elliptical-shaped curved end regions that defines curved segment lengths, curved segment spans, and linear section lengths equivalent to ovaloid vent 120. An elliptical vent having equivalent nominal dimensions to ovaloid vent 120 additionally or alternatively may be referred to herein as an otherwise equivalent elliptical vent. As also referred to herein, elliptical-shaped curved end regions include, but are not limited to, circular curved end regions. As such, a conventional racetrack-shaped vent, which includes circular curved end regions, may be an otherwise equivalent elliptical vent as defined herein. The hydraulic diameter of the elliptical vent may be referred to as the elliptical hydraulic diameter. Thus, stated in slightly different terms, the hydraulic diameter of ovaloid vent 120 is greater than the elliptical hydraulic diameter of an otherwise equivalent vent that includes elliptical-shaped curved end regions. In particular, the hydraulic diameter of ovaloid vent 120 may be a threshold fraction of the elliptical hydraulic diameter of the otherwise equivalent elliptical vent, with examples of this threshold fraction including at least 1.001, at least 1.002, at least 1.005, at least 1.006, at least 1.008, at least 1.01, at least 1.012, at least 1.015, at least 1.2, at most 1.008, at most 1.01, at most 1.012, at most 1.015, at most 1.02, at most 1.03, and/or at most 1.05. In view of the above, ovaloid vent 120 may permit fluid flow into and out of interior volume 136 with less flow resistance than an otherwise equivalent elliptical vent.

Further in view of the above, ovaloid vent 120 may be constructed with smaller nominal dimensions (i.e., perimeter length 204, and/or perimeter width 206) and meet the same flow requirements as an elliptical vent with larger nominal dimensions due to the enhanced hydraulic diameter of ovaloid vent 120. In other words, ovaloid vent 120 may meet or be constructed to possess a specified hydraulic diameter with nominal dimensions smaller than the nominal dimensions of an elliptical vent constructed to possess this specified hydraulic diameter. Accordingly, duct stringers 100 according to the present disclosure may be constructed with ovaloid vents 120 having smaller nominal dimensions as compared to the nominal dimensions of conventional, race-track-shaped vents in conventional duct stringers. As such, less massive pad-ups 34 may be utilized to reinforce duct stringers 100 according to the present disclosure than the pad-ups needed to reinforce a conventional duct stringer with conventional race-track shaped vents that meets the same flow requirements as duct stringers 100 according to the present disclosure.

In some examples, ovaloid vent 120 exhibits reduced stress concentration relative to an otherwise equivalent elliptical vent. In other words, duct stringer 100 may exhibit reduced stress concentration about ovaloid vent 120 relative to an otherwise equivalent duct stringer that includes the otherwise equivalent elliptical vent in place of ovaloid vent 120. As referred to herein, "the otherwise equivalent duct stringer" is identical to duct stringer 100 in every way except for having an otherwise equivalent elliptical vent in place of each ovaloid vent 120. In some examples, ovaloid vent 120 exhibits a peak stress concentration factor ($K_T$) under an axial load and/or under a shear load that is less than the peak stress concentration factor about the otherwise equivalent elliptical vent under the same axial load or shear load. As a more specific example, ovaloid vent 120 may exhibit a peak stress concentration factor under an axial load that is at least 5%, at least 7%, at least 8%, at least 10%, at least 12%, at least 15%, at least 20%, at most 10%, at most 12%, at most 15%, at most 20%, and/or at least 25% less than the peak stress concentration factor about the otherwise equivalent elliptical vent under the same axial load. As another more specific example, ovaloid vent 120 may exhibit a peak stress concentration factor under a shear load that is at least 10%, at least 12%, at least 15%, at least 17%, at least 20%, at least 25%, at most 17%, at most 20%, at most 25%, at most 30%, and/or at most 40% less than the peak stress concentration factor about the otherwise equivalent elliptical vent under the same shear load. As yet a further specific example, ovaloid vent 120 may exhibit a peak stress concentration factor, relative to the gross structural area of the segment of duct stringer 100 common to ovaloid vent 120, under an axial load of at most 1.5, at most 1.6, at most 1.7, at most 1.8, at most 1.9, at most 2, at least 1.5, at least 1.6, and/or at least 1.7.

Duct stringer 100 may be formed from any suitable one or more materials. In some examples, duct stringer 100 is formed of a composite material, and more specifically a fiber-reinforced composite material. Examples of suitable composite materials for forming duct stringer 100 are discussed in more detail herein. As mentioned, duct stringer 100 and/or skin 20 may comprise vent pad-up 34 disposed along duct stringer 100 and/or skin 20 about each ovaloid vent 120 and configured to reinforce duct stringer 100 and/or skin 20 about ovaloid vent 120. Stated another way, aircraft wing box 50 may comprise a vent pad-up 34 for reinforcing each ovaloid vent 120. In some examples, the reduced stress concentration exhibited by ovaloid vent 120 permits vent pad-up 34 to be constructed with a smaller mass relative to a pad-up that is needed to reinforce an otherwise equivalent elliptical vent. As also mentioned, in some examples, each vent pad-up 34 comprises additional plies, or layers, of fiber-reinforced composite material added to skin 20 and/or duct stringer 100 about ovaloid vent 120. In some such examples, vent pad-up 34 includes fewer layers or plies of fiber-reinforced composite material relative to a pad-up that is required to reinforce an otherwise equivalent elliptical vent. As more specific examples, the mass of vent pad-up 34 may be at least 2%, at least 4%, at least 5%, at least 8%, at least 10%, at least 15%, at least 17%, at least 20%, at least 25%, at most 10%, at most 15%, at most 17%, at most 20%, at most 25%, at most 30%, and/or at most 40% less than the mass of a pad-up that is required to reinforce an otherwise equivalent elliptical cutout.

Stated in broader terms, ovaloid vent 120 may afford weight savings in aircraft wing box 50 as compared to an otherwise equivalent aircraft wing box that includes an otherwise equivalent elliptical vent in place of each ovaloid vent 120 and the pad-up for the otherwise equivalent elliptical vent in place of each vent pad-up 34. As a more specific example, ovaloid vent 120 may afford weight savings in aircraft wing box 50 as compared to an otherwise equivalent aircraft wing box that comprises a conventional, racetrack-shaped vent in place of each ovaloid vent 120 and the pad-up for the conventional, racetrack-shaped vent in place of each pad-up 34. As referred to herein, the otherwise equivalent aircraft wing box is identical to aircraft wing box 50 in every way except for having otherwise equivalent elliptical vent (s), and/or conventional racetrack-shaped vents, in place of ovaloid vent(s) 120 and corresponding pad-up(s) that are more massive than vent pad-ups 34 for ovaloid vents 120. For example, when aircraft wing box 50 comprises a plurality of duct stringers 100 that collectively comprise a plurality of ovaloid vents 120 (e.g., 10 ovaloid vents), the total mass of aircraft wing box 50 may be at least 0.5%, at least 0.7%, at least 0.8%, at least 0.9%, at least 1%, at least 1.2%, at least 1.3%, at least 1.5%, at least 1.7%, at least 2%, at most 1%, at most 1.2%, at most 1.3%, at most 1.5%, at most 2%, at most 2.2%, at most 2.3%, at most 3%, at most 4%, and/or at most 5% less than the otherwise equivalent aircraft wing box.

Figure 6:
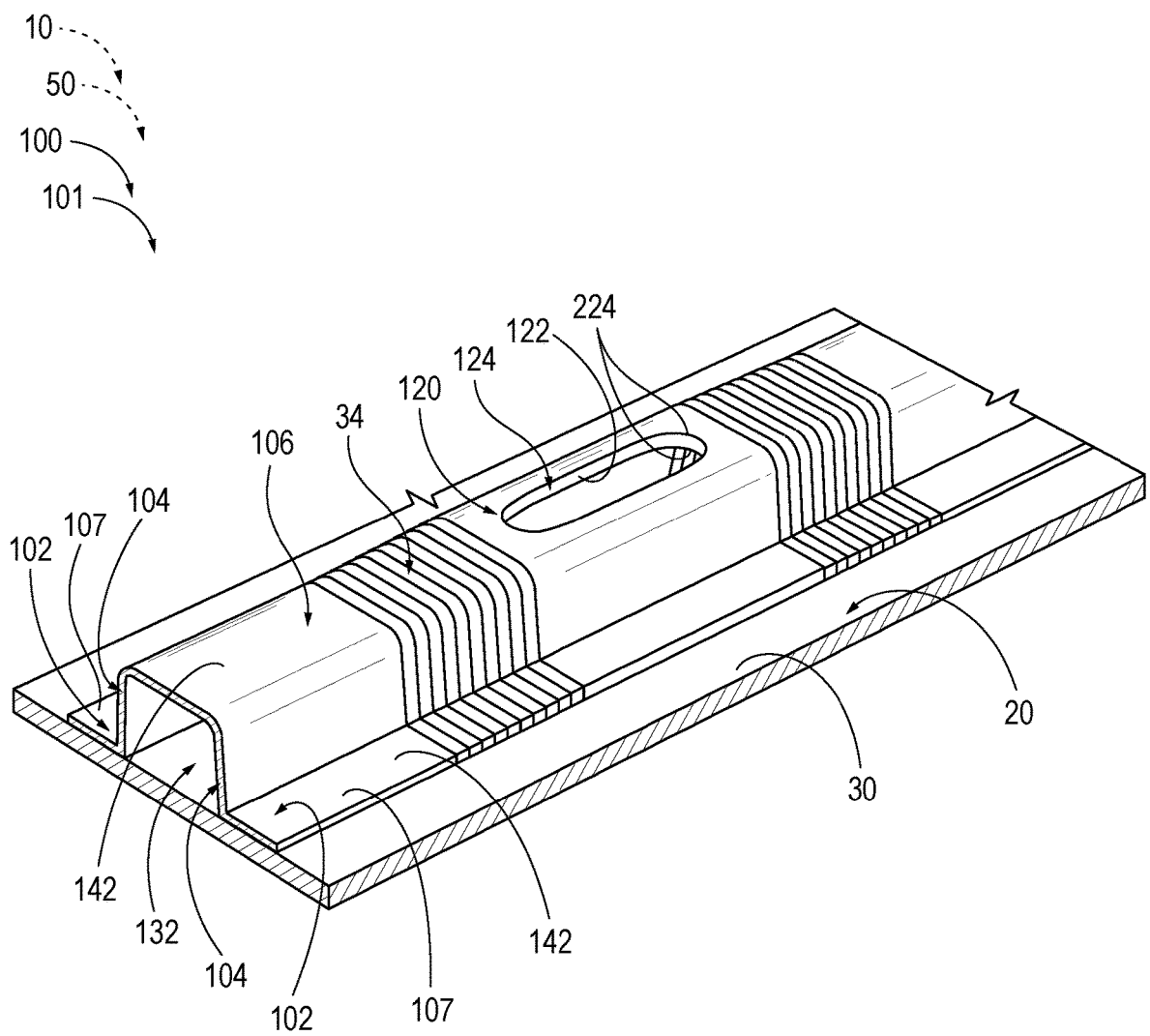
FIG. 6 is an isometric view illustrating a less-schematic example duct stringer according to the present disclosure.
Figure 7:
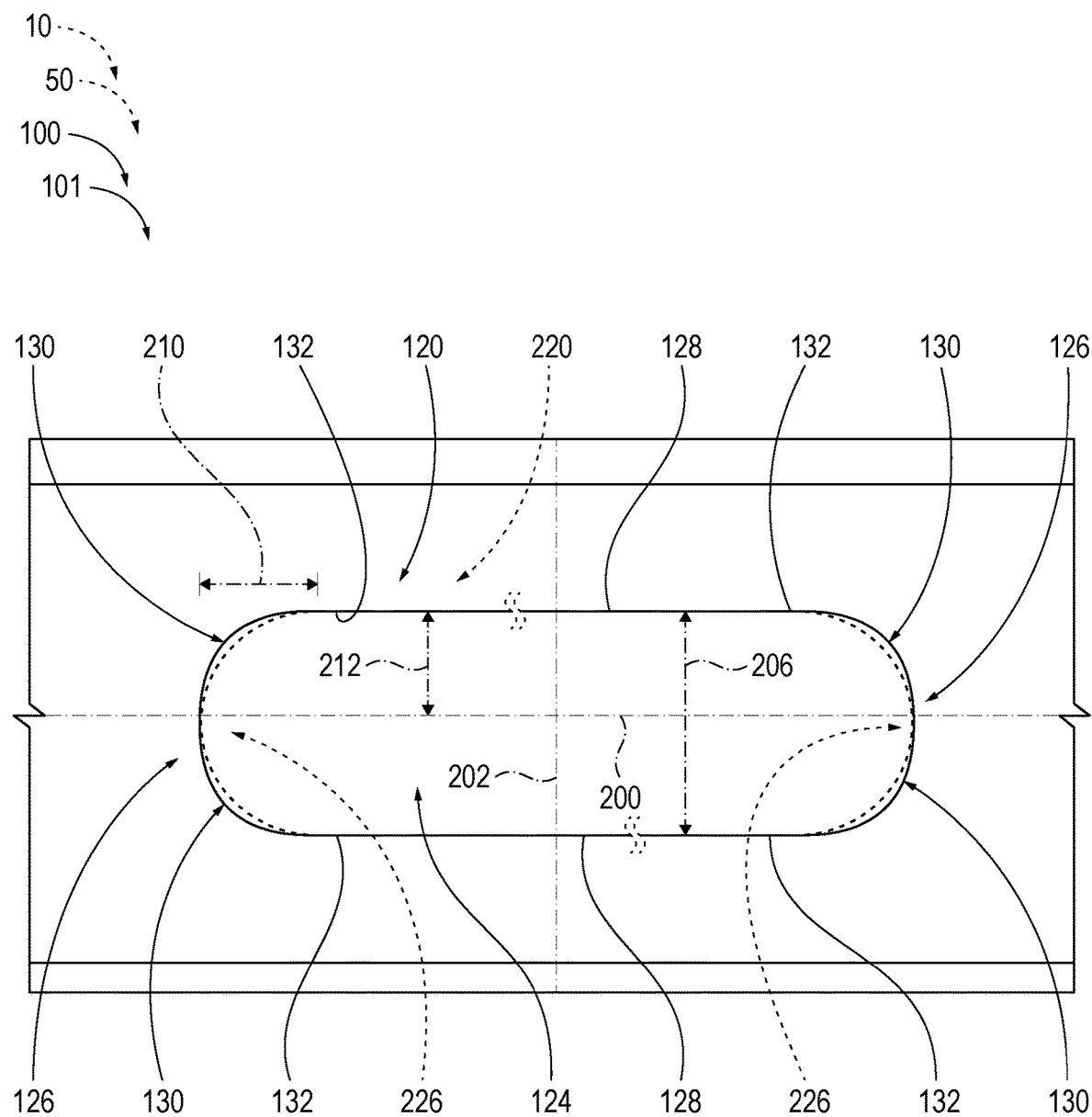
FIG. 7 is a partial plan view showing an ovaloid vent of the example duct stringer of FIG. 6.

FIGS. 6-7 provide an illustrative, non-exclusive example of duct stringers 100 that is indicated at and referred to herein as duct stringer 101. More specifically, FIG. 6 is a partial isometric view showing duct stringer 101 attached to skin 20, and FIG. 7 is a partial plan view of duct stringer 101 centered on ovaloid vent 120. Where appropriate, the reference numerals from schematic FIGS. 1-5 are used to designate corresponding parts of the example duct stringer 101 of FIGS. 6-7; however, duct stringer 101 is non-exclusive and does not limit duct stringers 100 and/or aircraft wing boxes 50 to the illustrated embodiments of FIGS. 6-7. That is, duct stringers 100 and/or aircraft wing boxes 50 may incorporate any of the various aspects, configurations, characteristics, properties, variants, options etc. of duct stringers 100 and/or aircraft wing boxes 50 that are illustrated in and discussed with reference to the schematic representation of FIG. 1-5 and/or the embodiment of FIGS. 6-7, as well as variations thereof, without requiring the inclusion of all such aspects, configurations, characteristics, properties, variants, options, etc. Furthermore, any additional aspects, configurations, characteristics, properties, variants, options, etc. disclosed in connection with the example duct stringer 101 of FIGS. 6-7 may be utilized with and/or otherwise comprised in duct stringers 100 and/or aircraft wing boxes 50, including those according to FIGS. 1-5. For the purpose of brevity, each previously discussed component, part, portion, aspect, region, etc. or variants thereof may not be discussed, illustrated, and/or labeled again with respect to the example of FIGS. 6-7.

With initial reference to FIG. 6, base 102 of duct stringer 101 includes flanges 107 that extend at least substantially parallel to cap wall 106 and/or skin interior surface 30 of skin 20. Skin 20 may be upper skin 26 or lower skin 28, as discussed herein. Flanges 107 are spaced apart from one another by interior volume 136, and a corresponding sidewall 104 projects from an inside edge of either flange 107. In this example, base 102 is sealingly attached to skin 20 such that skin 20 forms the fourth side to interior volume 136. Ovaloid vent 120 is provided centrally on cap wall 106, and aperture 124 thereof extends through a thickness 224 of cap wall 106 and into interior volume 136. As such, perimeter 122 extends along the thickness 224 of cap wall 106 and defines a ring-shaped surface that encompasses aperture 124.

In this example, duct stringer 101 is formed of a fiber-reinforced material. Duct stringer 101 further includes vent pad-up 34 for reinforcing ovaloid vent 120. More specifically, vent pad-up 34 includes additional layers or plies of fiber-reinforced composite material successively layered on top of exterior surfaces 142 of duct stringer 101 adjacent to ovaloid vent 120. These additional layers of fiber-reinforced composite material increase the thickness 224 of duct stringer 101 in the region of ovaloid vent 120 to accommodate for aperture 124 thereof. In this specific example, vent pad-up 34 comprises ten additional layers of fiber-reinforced composite material layered in a stepped pattern with the thickness 224 of duct stringer 101 increasing towards, plateauing along, and decreasing away from ovaloid vent 120 along vent pad-up 34.

As shown in FIG. 7, ovaloid vent 120 includes curved end regions 126 and a pair of linear sections 128 that extend between and separate curved end regions 126 from one another. Each curved end region 126 comprises a first curved segment 130 and a second curved segment 130 that meet one another at longitudinal axis 200 and that together form the entirety of the corresponding curved end region 126. Each curved segment 130 defines curved segment length 210 and curved segment span 212, and each curved segment 130 substantially has the formula defined by Equation 2. Each curved end region 126 defines a curved end region length that is equivalent to curved segment length 210 and a curved end region span that is equal to perimeter width 206, or twice curved segment span 212.

FIG. 7 also illustrates an otherwise equivalent elliptical vent 220 in dashed lines. Otherwise equivalent elliptical vent 220 comprises a perimeter having linear sections 128 that are aligned with linear sections 128 of ovaloid vent 120. Each elliptical curved end region 226 also includes a pair of proximal ends 132 that are aligned with proximal ends 132 of curved end region 126 of ovaloid vent 120. Specifically, each elliptical curved end region 226 comprises a span that is identical to the curved end region span of curved end region 126, and a length that is identical to the curved end region length of curved end region 126. Each elliptical curved end region 226 has the formula defined by Equation 1. As shown, each elliptical curved end region 226 encompasses a smaller area of aperture 124 than does curved end region 126 of ovaloid vent 120. Accordingly, the perimeter of otherwise equivalent elliptical vent 220 encompasses a smaller area of aperture 124 than does perimeter 122 of ovaloid vent 120. For related reasons, otherwise equivalent elliptical vent 220 also comprises a smaller hydraulic radius than does ovaloid vent 120.

Figure 8:
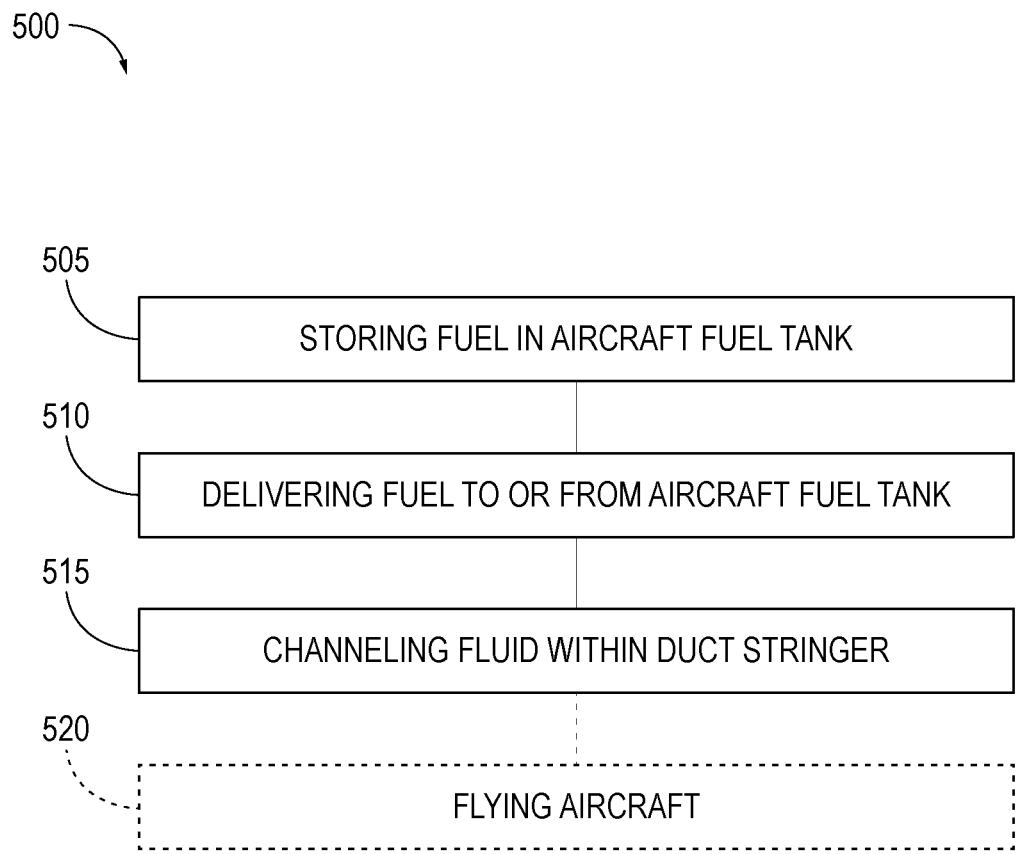
FIG. 8 is a flowchart schematically representing examples of methods according to the present disclosure.

FIG. 8 provides a flowchart illustrating examples of methods 500 of operating an aircraft according to the present disclosure. In FIG. 8, some steps are illustrated in dashed boxes, indicating that such steps may be optional or may correspond to an optional version of methods 500, according to the present disclosure. That said, not all methods according to the present disclosure are required to include the steps illustrated in solid boxes. The methods and steps of FIG. 8 are not limiting and other methods and steps are within the scope of the present disclosure, including methods having greater than or fewer than the number of steps illustrated, as understood from the discussion herein. Each step or portion of methods 500 may be performed utilizing aircraft 10, aircraft wing boxes 50, and/or duct stringers 100 and/or the features, functions, and/or portions thereof that are discussed in detail herein with respect to FIGS. 1-7. Likewise, any of the features, functions, and/or structures of aircraft 10, aircraft wing boxes 50, and/or duct stringers 100 discussed herein with reference to FIG. 8 may be included in and/or utilized in the examples of FIGS. 1-7 without departing from the scope of the present disclosure.

The aircraft utilized in methods 500 comprises wings 12 supported by a fuselage 11. Each wing 12 comprises an aircraft wing box 50, and at least one of the aircraft wing boxes 50 comprises at least one duct stringer 100, as discussed herein. Each aircraft wing box 50 also defines at least one aircraft fuel tank 40 within aircraft wing box 50, and duct stringer 100 comprises an ovaloid vent 120 that is in fluid communication with aircraft fuel tank 40. Each aircraft wing box 50 further may include a surge tank 52 separate from aircraft fuel tank(s) 40, and each duct stringer 100 further may include a second ovaloid vent 120 in fluid communication with surge tank 52. In some examples, each duct stringer 100 is attached to upper skin 26 of aircraft wing box 50.

As shown in FIG. 8, methods comprise storing 505 aircraft fuel within the aircraft fuel tank, delivering 510 aircraft fuel to or from the aircraft fuel tank, and channeling 515 fluid within duct stringer 100. In some examples, methods 500 include flying the aircraft.

In some examples, the storing 505 comprises storing aircraft fuel within the aircraft fuel tank 40 that is utilized by corresponding engines 44 of the aircraft 10 to propel the aircraft 10. In some examples, the storing 505 comprises fluidly partitioning or isolating the aircraft fuel within the aircraft fuel tank 40 from other regions of aircraft wing box 50, such as discussed herein. In some examples, the storing 505 comprises storing aircraft fuel in a plurality of aircraft fuel tanks 40 comprised in a given aircraft wing box and/or storing aircraft fuel in an aircraft fuel tank 40 of each aircraft wing box 50. In some examples, the storing 505 comprises maintaining a pressure within the aircraft fuel tank 40 within a selected pressure range.

The storing 505 is performed with any suitable sequence or timing within methods 500, such as prior to, at least substantially simultaneously with, and/or subsequent to delivering 510, channeling 515, and/or flying 520.

Methods 500 further comprise delivering 510 the aircraft fuel to or from the aircraft fuel tank 40. In some examples, the delivering 510 comprises delivering the aircraft fuel to the aircraft fuel tank 40 to fill, or at least partially fill, the aircraft fuel tank with the aircraft fuel. The filling the aircraft fuel tank 40 may be performed during fueling operations and/or prior to flying 520 the aircraft 10. In some examples, the delivering 510 comprises delivering fuel from the aircraft fuel tank 40 to a corresponding engine 44 of the aircraft 10. In some examples, the delivering 510 comprises delivering fuel to or from the plurality of aircraft fuel tanks 40 of a given aircraft wing box 50, and this may be performed as simultaneous or separate operations with respect to each aircraft fuel tank 40. In some examples, the delivering 510 comprises delivering aircraft fuel from the aircraft fuel tank 40 via the duct stringer 100, in which case at least this portion of the delivering 510 is performed simultaneously with channeling 515. In a more specific example, the delivering 510 may include overfilling the aircraft fuel tank 40 with aircraft fuel, and the delivering 510 further comprises channeling 515 excess fuel from the aircraft fuel tank 40 through the duct stringer 100, and optionally into the surge tank 52.

The delivering 510 is performed with any suitable sequence or timing within methods 500, such as prior to, at least substantially simultaneously with, and/or subsequent to the storing 505, channeling 515, and/or flying 520.

Methods 500 further comprise channeling 515 fluid through the duct stringer 100 into or out of the aircraft fuel tank 40 via the ovaloid vent 120 of the duct stringer 100. More specifically, the channeling 515 comprises channeling fluid through the aperture 124 of ovaloid vent 120 and through the interior volume 136 of duct stringer 100. For examples in which duct stringer 100 is attached to upper skin 26, the channeling 515 comprises channeling the fluid along the upper skin 26. In some examples, the channeling 515 comprises channeling the fluid along or in a direction aligned with the span of aircraft wing box 50.

The channeling 515 comprises channeling any suitable type of fluid, for example, air, a gas, an inert gas, aircraft fuel vapors, aircraft fuel, and/or combinations thereof. In some examples, the channeling 515 comprises or is performed to maintain the pressure within aircraft fuel tank 40 within the desired pressure range. In some examples, the channeling 515 comprises venting aircraft fuel vapor and/or gas within aircraft fuel tank 40 through the duct stringer 100 to maintain the pressure within the aircraft fuel tank 40 within the selected pressure range. In some examples, the channeling 515 comprises equalizing pressure in the aircraft fuel tank 40 with atmosphere, which may include increasing pressure or decreasing pressure in the aircraft fuel tank 40, for example depending on whether the aircraft 10 is climbing or descending. In some such examples, the venting comprises reducing pressure within the aircraft fuel tank 40. In a more specific example, the channeling 515 comprises the venting to accommodate for atmospheric pressure changes experienced by the aircraft 10 during the flying 520. In some examples, the venting comprises channeling 515 the fluid from the aircraft fuel tank 40 to the atmosphere or exterior to the aircraft 10 such as to limit Ullage or pressure build-up in aircraft fuel tank 40.

In some examples, the channeling 515 is performed simultaneously with the delivering 510. In a more specific example, the channeling 515 comprises exhausting gas in the headspace of aircraft fuel tank 40 via ovaloid vent 120 and duct stringer 100 during the delivering 510 the aircraft fuel to aircraft fuel tank 40. In another more specific example, the channeling 515 comprises channeling gas into the aircraft fuel tank 40 during the delivering 510 the aircraft fuel from the aircraft fuel tank. In yet more specific examples, the aircraft 10 may comprise a nitrogen inerting system configured to provide nitrogen gas to the aircraft fuel tank 40 such as during the delivering 510 the aircraft fuel from the aircraft fuel tank 40. In some such examples, the channeling 515 comprises channeling nitrogen gas from the nitrogen inerting system, through the duct stringer 100, out of the ovaloid vent 120, and into the aircraft fuel tank 40.

For some examples in which duct stringer 100 is attached to upper skin 26, ovaloid vent 120 is positioned above an operating liquid level of the aircraft fuel within aircraft fuel tank 40 such that ovaloid vent 120 is in fluid communication with gas, vapors, or air above the aircraft fuel within aircraft fuel tank 40 unless the aircraft fuel exceeds this operating liquid level. In such examples, the channeling 515 comprises channeling gas and/or vapor but not aircraft fuel under nominal conditions. In some examples, the delivering 510 comprises overfilling the aircraft fuel tank 40 with the aircraft fuel, such that ovaloid vent 120 is in fluid communication with the aircraft fuel in aircraft fuel tank 40. In some such examples, the channeling 515 comprises channeling aircraft fuel from the aircraft fuel tank 40 via ovaloid vent 120. In some such examples, duct stringer 100 comprises a second ovaloid vent 120 in fluid communication with the surge tank 52, and the channeling 515 comprises channeling the aircraft fuel into the surge tank 52 via the second ovaloid vent 120.

As mentioned, in some examples, the aircraft 10 utilized in methods 500 comprises a plurality of duct stringers 100. In some such examples, methods 500 comprise performing any of the steps discussed herein with respect to the duct stringer 100 with each of and/or any suitable number of the plurality of duct stringers 100. The channeling 515 may be performed with any suitable sequence or timing within methods 500, such as at least substantially simultaneously with the storing 505, the delivering 510 and/or flying 520.

In some examples, methods 500 comprise flying 520 the aircraft 10. The flying 520 the aircraft 10 may comprise performing any of the flight operations that are well known to a person of ordinary skill in the art. The flying 520 may comprise transporting a payload and/or passengers with the aircraft 10 and/or using the aircraft 10 to transport a payload and/or passengers. The flying 520 typically comprises utilizing aircraft fuel, in which case the delivering 510 and the channeling 515 are performed as portions of the flying 520, as discussed herein. The flying 520 also typically comprises changing the elevation of the aircraft, and the channeling 515 may be performed simultaneously thereto to maintain the pressure of the aircraft fuel tank within the selected pressure range.

Illustrative, non-exclusive examples of inventive subject matter according to the present disclosure are described in the following enumerated paragraphs:

A. A duct stringer (100) for an aircraft wing box (50), the duct stringer (100) comprising:

a base (102);
a pair of sidewalls (104) projecting from the base (102) in a spaced-apart relationship;
a cap wall (106) extending between and interconnecting the pair of sidewalls (104), wherein the cap wall (106) is spaced apart from the base (102) by the pair of sidewalls (104); and
an ovaloid vent (120) formed in the cap wall (106), wherein the ovaloid vent (120) comprises a perimeter (122) that circumscribes an aperture (124) and that defines a closed shape, wherein the perimeter (122) comprises a pair of curved end regions (126) opposed to one another and that each arc at least substantially through 180 degrees, wherein each curved end region (126) of the pair of curved end regions (126) comprises a non-uniform radius of curvature.

A1. The duct stringer (100) of paragraph A, wherein each curved end region (126) of the pair of curved end regions (126) comprises a non-elliptical curved shape.

A2. The duct stringer (100) of any of paragraphs A-A1, wherein the closed shape is a convex closed shape.

A3. The duct stringer (100) of any of paragraphs A-A2, wherein the ovaloid vent (120) defines a longitudinal axis (200) and a lateral axis (202) normal to the longitudinal axis (200), wherein the longitudinal axis (200) bisects each curved end region (126) of the pair of curved end regions (126), and wherein the lateral axis (202) interposes the pair of curved end regions (126) such that the pair of curved end regions (126) extend from either side of the lateral axis (202).

A4. The duct stringer (100) of paragraph A3, wherein the pair of curved end regions (126) is symmetrical about the longitudinal axis (200) and symmetrical about the lateral axis (202).

A5. The duct stringer (100) of any of paragraphs A3-A4, wherein the perimeter (122) further comprises a pair of linear sections (128) extending parallel to the longitudinal axis (200) and spaced apart from one another along the lateral axis (202), and wherein the pair of linear sections (128) extend between and interconnect the pair of curved end regions (126).

A6. The duct stringer (100) of any of paragraphs A3-A5, wherein the ovaloid vent (120) is elongated along the longitudinal axis (200).

A7. The duct stringer (100) of any of paragraphs A3-A6, wherein the longitudinal axis (200) of the ovaloid vent (120) is substantially aligned with a length (214) of the duct stringer (100).

A8. The duct stringer (100) of any of paragraphs A3-A7, wherein each curved end region (126) comprises a first curved segment (130) and a second curved segment (130) that meet one another at the longitudinal axis (200).

A9. The duct stringer (100) of paragraph A8, wherein each curved segment (130) comprises a proximal end (132) extending nearest to the lateral axis (202) and a distal end (134) that meets the longitudinal axis (200).

A10. The duct stringer (100) of paragraph A9, wherein each curved segment (130) approaches a parallel relationship to or is parallel to the longitudinal axis (200) at its proximal end (132), and wherein each curved end region (126) approaches a parallel relationship to the lateral axis (202) at its proximal end (132).

A11. The duct stringer (100) of any of paragraphs A9-A10, wherein each curved segment (130) comprises a decreasing radius of curvature in a direction from the proximal end (132) to the distal end (134).

A12. The duct stringer (100) of any of paragraphs A9-A11, wherein each curved segment (130) defines a curved segment length (210) and a curved segment span (212), wherein the curved segment length (210) is measured along the longitudinal axis (200) between the proximal end (132) and the distal end (134) thereof, and wherein the curved segment span (212) is measured along the lateral axis (202) between the proximal end (132) and the distal end (134) thereof.

A13. The duct stringer (100) of paragraph A12, wherein each curved segment (130) encompasses a respective area of the aperture (124) that is greater than an area encompassed by an elliptical curved segment having an equivalent curved segment length (210) and an equivalent curved segment span (212).

A14. The duct stringer (100) of any of paragraphs A12-A13, wherein each curved segment (130) substantially has the formula:

$$y(x) = \frac{b(2\sqrt{a}\sqrt{a-x} - (a-x))}{b};$$

wherein b is the curved segment span (212), a is the curved segment length (210), x is taken along an axis aligned with the longitudinal axis, and y is taken along an axis parallel to the lateral axis.

A15. The duct stringer (100) of any of paragraphs A12-A14, wherein the cap wall (106) defines a cap wall width (216), wherein the curved segment span (212) is a threshold fraction of the cap wall width (216), wherein the threshold fraction of the curved segment span (212) to the cap wall width (216) is at least 0.2, at least 0.25, at least 0.3, at least 0.32, at least 0.33, at last 0.35, at least 0.36, at least 0.38, at least 0.4, at most 0.3, at most 0.32, at most 0.33, at most 0.35, at most 0.36, at most 0.38, at most 0.4, at most 0.42, at most 0.45, and/or at most 0.49.

A16. The duct stringer (100) of any of paragraphs A12-A15, when depending from paragraph A5, wherein each linear section (128) defines a linear section length (208), wherein the curved segment length (210) is a threshold fraction of the linear section length (208), and wherein the threshold fraction of the curved segment length (210) to the linear section length is at least 0.2, at least 0.3, at least 0.35, at least 0.4, at least 0.45, at least 0.5, at least 0.6, at least 0.65, at least 0.7, at least 0.75, at least 0.8, at least 0.9, at least 1.0, at least 1.1, at least 1.2, at least 1.3, at most 0.3, at most 0.35, at most 0.4, at most 0.45, at most 0.5, at most 0.6, at most 0.65, at most 0.7, at most 0.74, at most 0.8, at most 0.9, at most 1.0, at most 1.1, at most 1.2, at most 1.3, at most 1.4, and/or at most 1.5.

A17. The duct stringer (100) of any of paragraphs A12-A16, wherein the curved segment length (210) is a threshold fraction of the curved segment span (212), and wherein the threshold fraction of the curved segment length (210) to the curved segment span (212) is at least 1, at least 1.2, at least 1.4, at least 1.5, at least 1.6, at least 1.7, at least 1.8, at least 1.9, at least 2, at least 2.2, at least 2.4, at most 1.2, at most 1.4, at most 1.5, at most 1.6, at most 1.7, at most 1.8, at most 1.9, at most 2, at most 2.2, at most 2.4, at most 2.6, and/or at most 3.

A18. The duct stringer (100) of any of paragraphs A-A17, wherein the ovaloid vent (120) is centered on the cap wall (106) such that a/the longitudinal axis (200) of the ovaloid vent (120) bisects a/the cap wall width (216) of the cap wall (106).

A19. The duct stringer (100) of any of paragraphs A-A18, wherein the ovaloid vent (120) comprises a hydraulic diameter that is greater than an elliptical hydraulic diameter of an elliptical vent (220) having equivalent nominal dimensions.

A20. The duct stringer (100) of paragraph A19, wherein the hydraulic diameter of the ovaloid vent (120) is a threshold fraction of the elliptical hydraulic diameter, wherein the threshold fraction of the hydraulic diameter to the elliptical hydraulic diameter is at least 1.001, at least 1.002, at least 1.005, at least 1.006, at least 1.008, at least 1.01, at least 1.012, at least 1.015, at least 1.2, at most 1.008, at most 1.01, at most 1.012, at most 1.015, at most 1.02, at most 1.03, and/or at most 1.05.

A21. The duct stringer (100) of any of paragraphs A-A20, wherein the ovaloid vent (120) exhibits a peak stress concentration factor (Kt) under axial stress that is at least 5%, at least 7%, at least 8%, at least 10%, at least 12%, at least 15%, at least 20%, at most 10%, at most 12%, at most 15%, at most 20%, and/or at least 25% less than the peak stress concentration factor about an otherwise equivalent elliptical vent under the same axial load.

A21.1. The duct stringer (100) of any of paragraphs A-A20, wherein the ovaloid vent (120) exhibits a peak stress concentration factor (Kt) under shear stress that is at least 10%, at least 12%, at least 15%, at least 17%, at least 20%, at least 25%, at most 17%, at most 20%, at most 25%, at most 30%, and/or at most 40% less than the peak stress concentration factor about an/the otherwise equivalent elliptical vent under the same shear load.

A22. The duct stringer (100) of any of paragraphs A-A21.1, wherein the duct stringer (100) comprises an interior volume (136) defined between the pair of sidewalls (104), the cap wall (106), and the base (102) or a skin interior surface (30), and wherein the ovaloid vent (120) is configured to permit fluid communication to the interior volume (136) from a region exterior to the duct stringer (100).

A23. The duct stringer (100) of paragraph A22, wherein the duct stringer (100) is configured to channel fluid flow within the interior volume (136), and wherein the ovaloid vent (120) is configured to permit fluid flow into and/or from the interior volume (136) via the aperture (124).

A24. The duct stringer (100) of any of paragraphs A-A23, wherein the ovaloid vent (120) is one of a plurality of ovaloid vents (120) comprised in the duct stringer (100).

A25. The duct stringer (100) of paragraph A24, wherein at least two ovaloid vents (120) of the plurality of ovaloid vents (120) are configured to provide fluid communication between two fluidly isolated regions of the aircraft wing box (50).

A26. The duct stringer (100) of paragraph A25, wherein the two fluidly isolated regions of the aircraft wing box comprise an aircraft fuel tank (40) and a surge tank (52).

A27. The duct stringer (100) of any of paragraphs A-A26, wherein the duct stringer (100) is formed of a fiber-reinforced composite material.

B. An aircraft wing box (50), comprising:
an upper skin (26);
a lower skin (28);
a leading spar (22);
a trailing spar (24) spaced aft of the leading spar (22);
a plurality of ribs (16) extending between and interconnecting the leading spar (22) and the trailing spar (24); and
a plurality of stringers (18) extending transverse to the plurality of ribs (16) operatively coupled to and supporting the upper skin (26), wherein at least one stringer (18) of the plurality of stringers (18) is the duct stringer (100) of any of paragraphs A-A27.

B1. The aircraft wing box (50) of paragraph B, further comprising a vent pad-up (34) integrated into the duct stringer (100) and/or the upper skin (26) and positioned to reinforce the aircraft wing box (50) about the ovaloid vent (120).

B2. The aircraft wing box (50) of paragraph B1, wherein the vent pad-up (34) comprises a vent pad-up mass that is less than a pad-up mass of a pad-up needed to reinforce an elliptical vent (220) having equivalent nominal dimensions to the ovaloid vent (120).

B3. The aircraft wing box (50) of paragraph B2, wherein the mass of the vent pad-up mass is at least 2%, at least 4%, at least 5%, at least 8%, at least 10%, at least 15%, at least 17%, at least 20%, at least 25%, at most 10%, at most 15%, at most 17%, at most 20%, at most 25%, at most 30%, and/or at most 40% less than the mass of the pad-up.

B4. The aircraft wing box (50) of any of paragraphs B2-B3, wherein two or more of the plurality of stringers (18) is the duct stringer (100), wherein the two or more duct stringers (100) collectively comprise a plurality of the ovaloid vents (120), wherein the aircraft wing box (50) comprises a total mass that is less than the total mass of an otherwise equivalent aircraft wing box that comprises a/the elliptical vent (220) in place of each ovaloid vent (120) of the plurality of ovaloid vents (120) and the pad-up in place of each vent pad-up (34).

B5. The aircraft wing box (50) of paragraph B4, wherein the total mass of the aircraft wing box (50) is at least 0.5%, at least 0.7%, at least 0.8%, at least 0.9%, at least 1%, at least 1.2%, at least 1.3%, at least 1.5%, at least 1.7%, at least 2%, at most 1%, at most 1.2%, at most 1.3%, at most 1.5%, at most 2%, at most 2.2%, at most 2.3%, at most 3%, at most 4%, and/or at most 5% less than the mass of the otherwise equivalent aircraft wing box.

B6. The aircraft wing box (50) of any of paragraphs B-B5, wherein the duct stringer (100) comprises a/the plurality of ovaloid vents (120) spaced apart from one another along a/the length of the duct stringer (100).

B7. The aircraft wing box (50) of any of paragraphs B-B6, wherein the base (102) of the duct stringer (100) is coupled to a skin interior surface (30) of the upper skin (26) and the cap wall (106) faces an interior space (32) of the aircraft wing box (50), wherein the aircraft wing box (50) further comprises an aircraft fuel tank (40) and a surge tank (52) defined within the interior space (32) and fluidly isolated from one another, wherein the duct stringer (100) comprises a/the plurality of ovaloid vents (120), wherein a first ovaloid vent (120) of the plurality ovaloid vents (120) is positioned within the aircraft fuel tank (40) and a second ovaloid vent (120) of the plurality of ovaloid vents (120) is positioned within the surge tank (52), and wherein the first ovaloid vent (120) and the second ovaloid vent (120) are configured to provide fluid communication between the aircraft fuel tank (40) and the surge tank (52).

B8. The aircraft wing box (50) of any of paragraphs B-B7, wherein the aircraft wing box (50) is a composite aircraft wing box (50).

C. An aircraft (10), comprising:
a fuselage (11); and
wings (12) supported by the fuselage (11), wherein each wing (12) comprises the aircraft wing box (50) of any of paragraphs B-B8.

C1. The aircraft (10) of paragraph C, wherein the aircraft (10) comprises an operating empty weight that is less than the operating empty weight of an otherwise equivalent aircraft that comprises an elliptical vent (220) in place of each ovaloid vent (120) of the aircraft (10).

C2. Use of the aircraft (10) of any of paragraphs C-C1 to transport a payload.

D. A method of operating an aircraft, the method comprising:
storing aircraft fuel within an/the aircraft fuel tank (40) of the aircraft wing box (50) of any of paragraphs B-B8;
delivering the aircraft fuel to or from the aircraft fuel tank (40); and
channeling fluid through the duct stringer (100) into or out of the aircraft fuel tank (40) via the ovaloid vent (120).

D1. The method of paragraph D, wherein the channeling comprises channeling fuel from the aircraft fuel tank (40) through the first ovaloid vent (120) and into the surge tank (52) through the second ovaloid vent (120).

D2. The method of any of paragraphs D-D1, further comprising flying the aircraft, wherein the channeling comprises venting aircraft fuel vapors through the duct stringer (100) during the flying.

D3. The method of paragraph D2, wherein the venting comprises reducing pressure in the aircraft fuel tank (40).

D4. The method of any of paragraphs D2-D3, wherein the delivering comprises delivering fluid from the aircraft fuel tank (40) during the flying, and wherein the channeling comprises channeling fluid into the aircraft fuel tank (40) through the duct stringer (100) during the delivering.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or"

clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Unless specifically defined otherwise, "at least substantially," as used herein when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A duct stringer for an aircraft wing box, the duct stringer comprising:
   a base;
   a pair of sidewalls projecting from the base in a spaced-apart relationship;
   a cap wall extending between and interconnecting the pair of sidewalls, wherein the cap wall is spaced apart from the base by the pair of sidewalls; and
   an ovaloid vent formed in the cap wall, wherein the ovaloid vent comprises a perimeter that circumscribes an aperture and that defines a closed shape, wherein the perimeter comprises a pair of curved end regions opposed to one another and that each arc at least substantially through 180 degrees, wherein each curved end region of the pair of curved end regions comprises a non-uniform radius of curvature.

2. The duct stringer of claim 1, wherein each curved end region of the pair of curved end regions comprises a non-elliptical curved shape.

3. The duct stringer of claim 1, wherein the ovaloid vent defines a longitudinal axis and a lateral axis normal to the longitudinal axis, wherein the longitudinal axis bisects each curved end region of the pair of curved end regions, and wherein the lateral axis interposes the pair of curved end regions such that the pair of curved end regions extend from either side of the lateral axis.

4. The duct stringer of claim 3, wherein the perimeter further comprises a pair of linear sections extending parallel to the longitudinal axis and spaced apart from one another along the lateral axis, and wherein the pair of linear sections extend between and interconnect the pair of curved end regions.

5. The duct stringer of claim 3, wherein each curved end region comprises a first curved segment and a second curved segment that meet one another at the longitudinal axis, wherein each curved segment comprises a proximal end extending nearest to the lateral axis and a distal end that meets the longitudinal axis, wherein each curved segment approaches a parallel relationship to or is parallel to the longitudinal axis at its proximal end, and wherein each curved end region approaches a parallel relationship to the lateral axis at its proximal end.

6. The duct stringer of claim 5, wherein each curved segment comprises a decreasing radius of curvature in a direction from the proximal end to the distal end.

7. The duct stringer of claim 5, wherein each curved segment substantially has the formula:

$$y(x) = \frac{b(2\sqrt{a}\sqrt{a-x} - (a-x)}{b};$$

wherein b is a curved segment span of the curved segment, a is a curved segment length of the curved segment, x is taken along an axis aligned with the longitudinal axis, and y is taken along an axis parallel to the lateral axis.

8. The duct stringer of claim 5, wherein the perimeter further comprises a pair of linear sections that extend between and interconnect the pair of curved end regions, wherein each linear section defines a linear section length, wherein each curved segment defines a curved segment length that is measured along the longitudinal axis between the proximal end and the distal end thereof, wherein the curved segment length is a threshold fraction of the linear section length, and wherein the threshold fraction of the curved segment length to the linear section length is at least 0.2 and at most 1.4.

9. The duct stringer of claim 5, wherein each curved segment defines a curved segment length and a curved segment span, wherein the curved segment length is measured along the longitudinal axis between the proximal end and the distal end thereof, and wherein the curved segment span is measured along the lateral axis between the proximal end and the distal end thereof, and wherein the curved segment length is a threshold fraction of the curved segment span, and wherein the threshold fraction of the curved segment length to the curved segment span is at least 1.4 and at most 2.5.

10. The duct stringer of claim 1, wherein the ovaloid vent comprises a hydraulic diameter that is greater than an elliptical hydraulic diameter of an elliptical vent having equivalent nominal dimensions.

11. The duct stringer of claim 10, wherein the hydraulic diameter of the ovaloid vent is a threshold fraction of the elliptical hydraulic diameter, wherein the threshold fraction of the hydraulic diameter to the elliptical hydraulic diameter is at least 1.001 and at most 1.05.

12. The duct stringer of claim 1, wherein the ovaloid vent exhibits a peak stress concentration factor (Kt) under axial stress that is at least 5% and at most 25% less than the peak stress concentration factor about an otherwise equivalent elliptical vent under the same axial load.

13. The duct stringer of claim 1, wherein the ovaloid vent is one of a plurality of ovaloid vents comprised in the duct stringer, wherein at least two ovaloid vents of the plurality of ovaloid vents are configured to provide fluid communication between two fluidly isolated regions of the aircraft wing box.

14. The duct stringer of claim 1, wherein the duct stringer is formed of a fiber-reinforced composite material.

15. An aircraft wing box, comprising:
an upper skin;
a lower skin;
a leading spar;
a trailing spar spaced aft of the leading spar;
a plurality of ribs extending between and interconnecting the leading spar and the trailing spar; and
a plurality of stringers extending transverse to the plurality of ribs operatively coupled to and supporting the upper skin, wherein at least one stringer of the plurality of stringers is the duct stringer of claim 1.

16. The aircraft wing box of claim 15, further comprising a vent pad-up integrated into the duct stringer or the upper skin and positioned to reinforce the aircraft wing box about the ovaloid vent.

17. The aircraft wing box of claim 16, wherein two or more of the plurality of stringers is the duct stringer, wherein the two or more duct stringers collectively comprise a plurality of the ovaloid vents, wherein the aircraft wing box comprises a total mass that is less than the total mass of an otherwise equivalent aircraft wing box that comprises the equivalent elliptical vent in place of each ovaloid vent of the plurality of ovaloid vents and the pad-up in place of each vent-pad up.

18. An aircraft, comprising:
a fuselage; and
wings supported by the fuselage, wherein each wing comprises the aircraft wing box of claim 15.

19. A method of operating an aircraft, the method comprising:
storing aircraft fuel within an aircraft fuel tank of the aircraft wing box of claim 15;
delivering the aircraft fuel to or from the aircraft fuel tank; and
channeling fluid through the duct stringer into or out of the aircraft fuel tank via the ovaloid vent.

20. The method of claim 19, wherein the channeling comprises equalizing pressure in the aircraft fuel tank with atmosphere surrounding the aircraft by venting fluid through the duct stringer.

* * * * *